Figure 1:
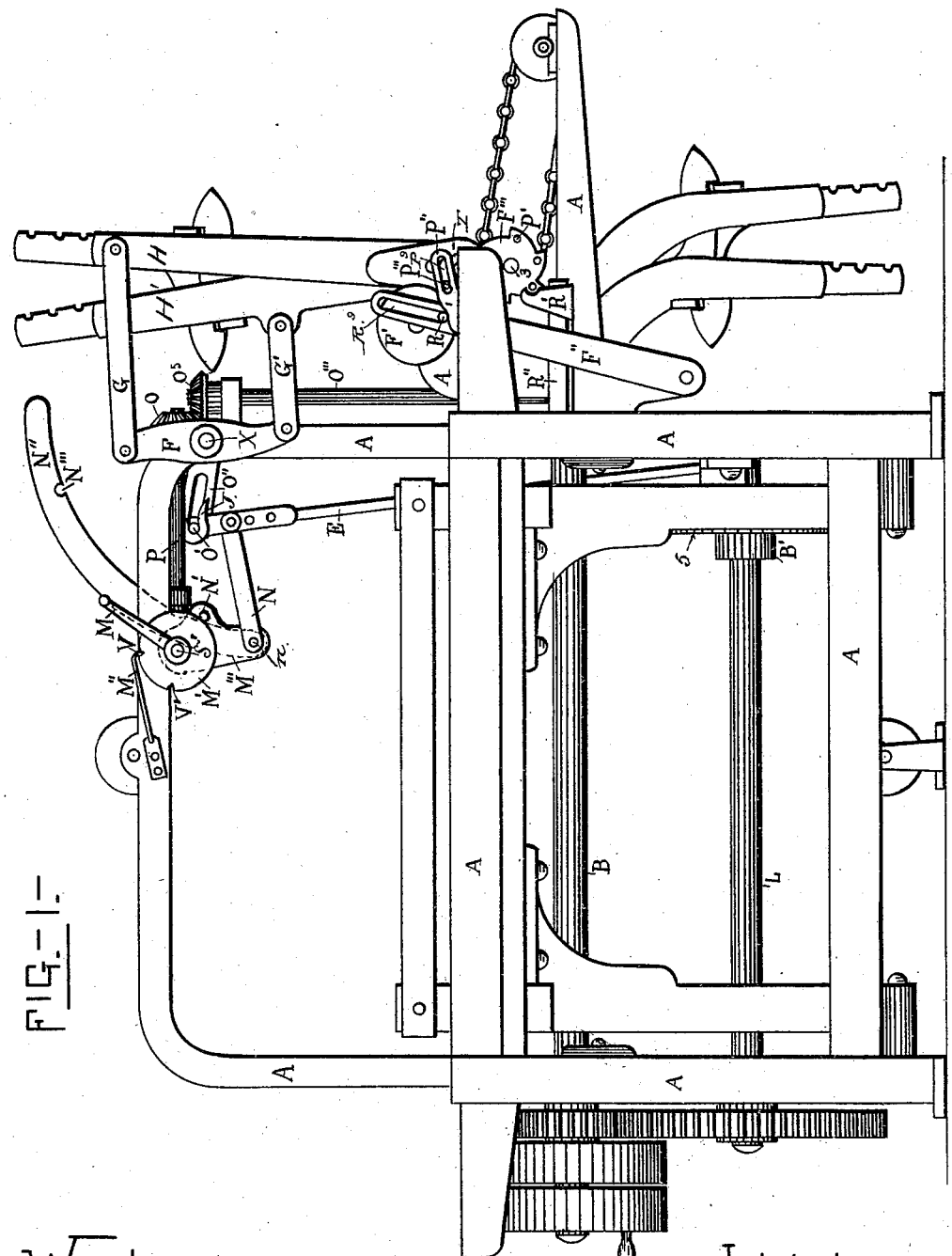

(No Model.) 3 Sheets—Sheet 1.

J. T. CREE.
SHEDDING MECHANISM FOR LOOMS.

No. 372,840. Patented Nov. 8, 1887.

WITNESSES.
N. H. Patterson
D. S. Clark.

INVENTOR.
J. Thompson Cree
per Atty N. H. Evans &co

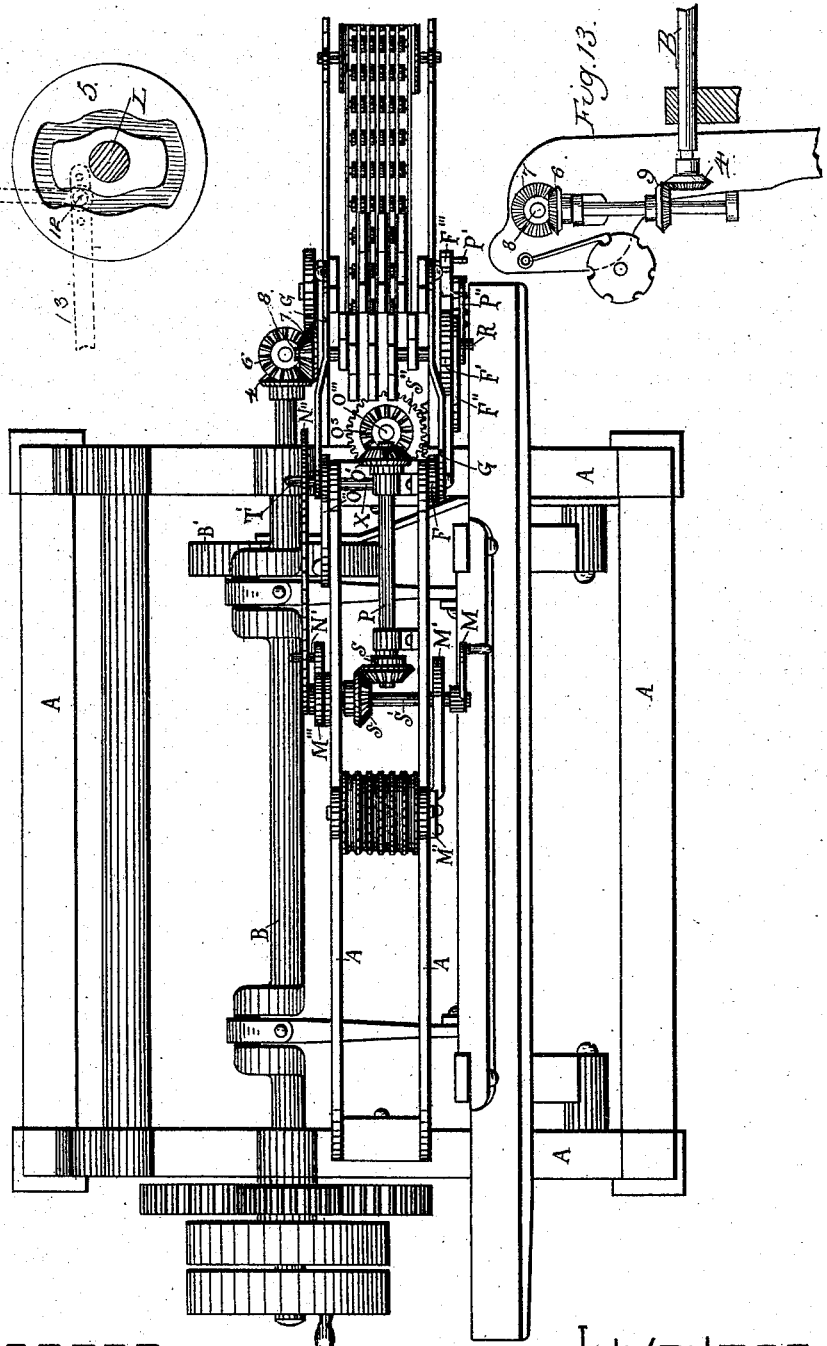

(No Model.) 3 Sheets—Sheet 3.
J. T. CREE.
SHEDDING MECHANISM FOR LOOMS.
No. 372,840. Patented Nov. 8, 1887.
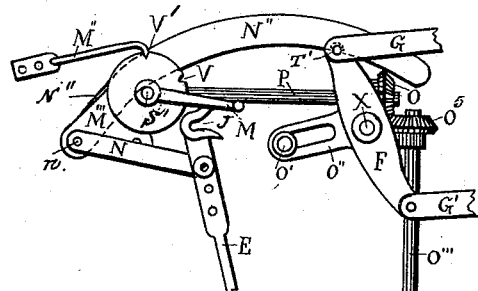
FIG.-3.-
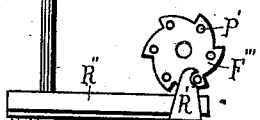
Fig. 5.
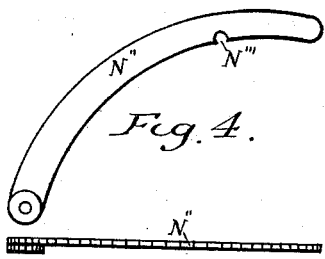
Fig. 4.
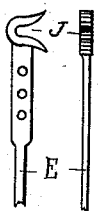
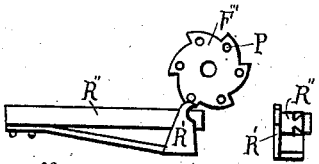
Fig. 6.
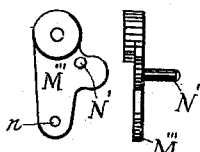
Fig. 7. Fig. 8.
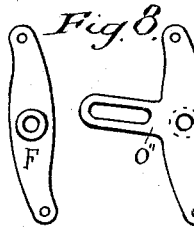
Fig. 9.
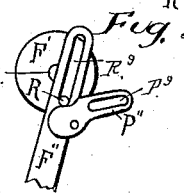
Fig. 10.
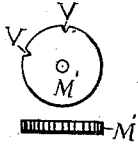
Fig. 11.
WITNESSES
N. H. Patterson
D. S. Clark
INVENTOR
J. Thompson Cree
per Atty A. H. Evans & Co.

UNITED STATES PATENT OFFICE.

J. THOMPSON CREE, OF WORCESTER, MASSACHUSETTS.

SHEDDING MECHANISM FOR LOOMS.

SPECIFICATION forming part of Letters Patent No. 372,840, dated November 8, 1887.

Application filed October 14, 1886. Serial No. 216,195. (No model.)

*To all whom it may concern:*

Be it known that I, J. THOMPSON CREE, a citizen of the United States, residing at Worcester, in the county of Worcester and State of Massachusetts, have invented certain new and useful Improvements in Shedding Mechanisms for Looms, of which the following is a full, clear, and exact description, reference being had to the accompanying drawings, forming part of this specification, in which—

Figure 1 is a front elevation of a loom embodying my invention. Fig. 2 is a plan view of the same. Fig. 3 is a detached view of the mechanism for discovering the lost "picks;" and Figs. 4 to 13, inclusive, are details representing the several portions of my invention.

My invention comprises certain improvements to be applied to a loom for unweaving cloth and ascertaining the location of "mispicks;" and it consists in the peculiar constructions and combinations of elements which I will hereinafter fully describe and claim.

To enable others skilled in the art to which my invention appertains to construct and use the same, I will now describe its construction and indicate the manner in which the same is carried out.

In the present instance the mechanism shown, which is to be employed in connection with that shown in my Letters Patent granted May 4, 1886, No. 341,133, is to unweave cloth or to enable a portion of the loom to be operated backward by hand (when the loom is not in motion) to find lost picks.

To properly appreciate the importance of my invention, I will refer, briefly, to the manufacture of "tricot," "doeskin," &c., and will suppose that during the weaving the filling runs out or breaks and the loom runs a number of picks without filling. To one skilled in the art it will be apparent if the shuttle be changed, new filling added, and the loom started again without finding where the filling left off and matching it, there will be a mispick—in other words, an imperfect place in the cloth. The pattern is therefore broken and the cloth damaged. In order to prevent defects in the cloth these imperfect places have in most cases to be picked out by hand after their discovery, before weaving is resumed; but by the use of my improvement this laborious process is dispensed with, the weaver easily picking out, one at a time, the threads of loose filling across the warp until the "overshot" or imperfection is picked out.

To more clearly develop my invention, I will now refer to the accompanying drawings, wherein—

A represents a frame, within which the crank-shaft B is suitably mounted. In the top of the frame A is journaled a transverse shaft, S', having secured thereon a disk or wheel, M', provided with notches V V', which, when said shaft and disk are turned, as hereinafter described, are alternately engaged by the free end of a spring, M'', secured to the frame A, as shown in Fig. 1. A handle or crank, M, on the shaft S', is designed to be used to partially rotate said shaft and wheel M' alternately in opposite directions, the spring M'' serving to engage the notches and hold the wheel in the two opposite positions shown in Figs. 1 and 3. The shaft S' is also provided with a bevel-gear, S, which meshes with a similar gear on the inner end of a longitudinal shaft, P, journaled in the frame and carrying at its outer end a bevel-gear, O', which meshes with a similar gear, O⁵, on a vertical shaft, O''', whereby, when shaft S' is actuated by the movement of the crank M, the shaft O''' is rotated to cause the pattern-chain and its attachment to be moved backward, for a purpose and in a manner which I will hereinafter fully describe.

In addition to the feature above enumerated, the shaft S' is provided at its other end with an arm, M'''', having a projecting pin or stud, N', while a curved catch-bar, N'', pivoted to the lower end of said arm by a pin, $n$, is provided with a notch, N''', and is engaged by the pin or stud N' to permit the raising and lowering of said catch-bar. The notch N''' in the bar N'' is designed to engage the pin T' on one of the rocker-arms F, said arms being connected by rods G G' with the riser and sinker frames, H H', as in my former patent. On the lower end of the shaft O''', before mentioned, is secured a pinion, S'', which engages and operates a rack-bar, R'', mounted on the frame of the loom and provided with a catch-spring, R', as shown in Figs. 1, 3, and 6.

The pitman E in the present case is connected with a lever, 13, carrying a pin, 12, engaging with the groove of the cam 5 on the lower or cam-shaft, L, (see Fig. 12,) the cam being preferably thus mounted in order to enable me to use a longer connecting-rod and to secure greater ease of movement. The pitman extends upwardly and is provided with a jaw, J, which engages a stud or pin, O', on the arm O'' of the rocker F, said pitman being connected with the arm M''' on the shaft S' by a link or connecting-rod, N, as shown.

From the foregoing description it is manifest, if the operator pulls the crank M in Fig. 1 downward, so as to rotate the wheel M' to bring the notch V into engagement with spring M'', the shaft S' will be rotated, and, through the medium of the arm M''' and rod N, will draw the pitman E away from the pin O'. The movement of the arm M''' and its pin N' with the shaft S' will first permit the catch-bar N'' to drop until its notch N''' engages the pin T' in the upper end of the rocker-bar F, and then, during the continuation of the movement of the crank, the bar N'' will serve to move the rocker from the position represented in Fig. 1 to that represented in Fig. 3, bringing the harness-levers, &c., into the closed-shed position. The partial rotation of shaft S' will also, by means of the shafts P and O''' and their respective gears, move the rack-bar R'' horizontally and cause the projecting hooked end of its catch-spring R' to engage one of the pins P', projecting from the adjacent face of a ratchet-wheel, F''', on the pattern barrel-shaft 3, thereby reversing the pattern-chain one step or bar. The movement of the crank M in the reverse direction will bring the parts again to their former positions ready for either repeating the operation or for the regular working of the loom being resumed; but now the harnesses will be shifted into the position they occupied in forming the shed immediately preceding in formation the shed last made in the regular working of the loom. In this movement the bar N'' first acts to move the rocker F back to the position of Fig. 1, the said bar then being engaged by the pin N' and lifted out of engagement with the pin O'. The operator may continue in this manner to operate the devices forming the sheds in reverse order, or unweaving until the lost pick is formed.

The stud N', before mentioned, by raising and lowering the catch-arm N'', as described, prevents any damage to the machinery by the carelessness or negligence of the weaver, as it is practically impossible for the shedding mechanism and pick-finding mechanism both to remain in operative connection while the loom is running. The curved catch-arm thus becomes the pitman for closing and opening the sheds during the period the pitman E is withdrawn from engagement with pin O'.

Motion is transmitted from the lay-shaft B, through bevel-gears 4, 9, and 6, (see Fig. 13,) to a bevel-gear, 7, on one end of a transverse shaft, 8, journaled in the frame of the loom and carrying at its opposite end a wheel or disk, F', having a crank-pin, R, working in the slot R⁹ of the lever F''. The pawl T is pivoted to the side of the said lever and engages with the ratchet-wheel F''' to impart forward rotation to the pattern barrel and chain and provided on its side with a pin, P''', projecting into the slot P⁹ of the riser P'', pivoted to the side of the lever F''. During the rotation of the wheel crank-pin R acts upon the slotted riser P'' to raise the pawl T from engagement with the ratchet-wheel F''' after each advance of the pattern barrel and chain, so that when the lay stands in its rearward position the pattern-barrel may be free to be operated by the pick-finding mechanism.

The old method of finding lost picks was, and in many looms to-day is, to take hold of a handle placed in ratchet-wheel F''', or its equivalent, and, turning the chain backward one notch or chain-bar, and then pushing the lay backward, to spring the harnesses until the shed is open wide enough to see and feel, by inserting the thumb and finger in the warp, if the pick is loose, and if not, repeat the operation until the loose pick is found.

With this invention the operator simply takes hold of the crank M and moves it downward and then upward from the notch V to V', and during each movement the pattern-chain is moved backward one bar and the heddles changed to correspond, (the operator inserting her thumb and finger, as above, until she finds the loose pick.) Thus the hard labor of handling the loom by hand is saved; also much time, which is money to the weaver, she working by the yard, and a saving to the manufacturer by getting more and better cloth.

Having thus described my invention, what I claim as new, and desire to secure by Letters Patent, is—

1. The combination, with the cam-shaft L, the rocker F, and riser and sinker frames connected therewith, of the pitman E, the grooved cam, the lever, the shaft S', the arm M''', a rod connecting said pitman and arm, and an operating-crank for withdrawing the pitman from engagement with the rocker, substantially as described.

2. The combination, with the cam-shaft L, the grooved cam, the lever, the pitman E, the rocker F, and the riser and sinker frames connected therewith, of the shaft S', the arm M''', rod N, a catch-bar pivoted to arm M''' for engaging the rocker to operate the same when the pitman is withdrawn, pin N', and a crank for actuating the arm and catch-bar, substantially as herein described.

3. The combination, with cam-shaft L, the grooved cam, the lever, the pitman E, the rocker, and the riser and sinker frames connected therewith, of the arm M''', a rod connecting the arm and pitman, the shaft S', the catch-bar N'', pin N', the notched disk or wheel M', the spring M'', and the operating-crank M, substantially as described.

4. The combination, with the pattern-chain, of the shafts S', P, and O''', having gears S, S, O, O$^5$, and S'', respectively, a rack-bar having a catch-spring, R', and ratchet-wheel F''', having pins P', engaged by said spring, substantially as and for the purpose set forth.

J. THOMPSON CREE.

Witnesses:
RUFUS B. DODGE, Jr.,
WILLIAM E. WHITE.